United States Patent
Marangon

(10) Patent No.: US 10,300,988 B2
(45) Date of Patent: May 28, 2019

(54) MECHANICAL ACTUATION DEVICE FOR ACTUATING THE CONTROL CABLE OF A BICYCLE DERAILLEUR

(71) Applicant: Campagnolo S.r.l., Vicenza (IT)

(72) Inventor: Christian Marangon, Thiene (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/893,148

(22) Filed: Feb. 9, 2018

(65) Prior Publication Data

US 2018/0229806 A1  Aug. 16, 2018

(30) Foreign Application Priority Data

Feb. 13, 2017  (IT) .................. 102017000015361

(51) Int. Cl.
  *B62M 25/04*  (2006.01)
  *B62K 23/02*  (2006.01)
  *B62K 23/06*  (2006.01)

(52) U.S. Cl.
  CPC ............. *B62M 25/04* (2013.01); *B62K 23/06* (2013.01)

(58) Field of Classification Search
  CPC ...... B62M 9/127; B62M 25/00; B62M 25/02; B62M 25/04; B62M 25/045; B62K 23/02; B62K 23/06
  See application file for complete search history.

(56) References Cited

U.S. PATENT DOCUMENTS

| | | |
|---|---|---|
| 5,020,387 A | 6/1991 | Nagano |
| 5,676,020 A | 10/1997 | Jordan et al. |
| 5,787,757 A | 8/1998 | Ozaki |
| 6,216,553 B1 | 4/2001 | Wessel et al. |
| 6,367,347 B1 | 4/2002 | Blaschke et al. |
| 6,484,603 B2 | 11/2002 | Wessel et al. |
| 7,285,064 B2 | 10/2007 | Ichida et al. |

(Continued)

FOREIGN PATENT DOCUMENTS

| | | |
|---|---|---|
| CN | 104691699 A | 6/2015 |
| CN | 204473057 U | 7/2015 |

(Continued)

OTHER PUBLICATIONS

Italian Search Report and Written Opinion in Italian Application No. 102017000015361, dated Oct. 19, 2017, with English translation.

*Primary Examiner* — Adam D Rogers

(74) *Attorney, Agent, or Firm* — Volpe and Koenig, P.C.

(57) ABSTRACT

A bicycle gear shifter that has a control pin and a cable-winding bush mounted coaxially and rotatable in opposite angular directions. A ball-carrying bush is mounted coaxially for rotation as a unit with the cable-winding bush and is equipped with at least one slider. An indexing bush is rotatable with respect to the control pin is provided with a plurality of stop positions engageable during a relative rotation between the ball-carrying bush and the indexing bush, each stop position defining a stable angular position for the cable-winding bush. A pointer is switchable between an active position in which it interacts with the indexing bush to limit the angular play thereof with respect to the casing and a passive position in which it does not interact with the indexing bush and does not limit the angular position between the indexing bush and the casing.

20 Claims, 5 Drawing Sheets

(56) References Cited

U.S. PATENT DOCUMENTS

| | | | |
|---|---|---|---|
| 7,650,813 B2 | 1/2010 | Tsumiyama | |
| 8,485,060 B2 | 7/2013 | Emura et al. | |
| 8,550,942 B2 | 10/2013 | Oda et al. | |
| 9,334,020 B2 | 5/2016 | Shahana | |
| 10,040,512 B2* | 8/2018 | Minto | B62M 25/04 |
| 2016/0355235 A1 | 12/2016 | Minto et al. | |
| 2017/0341709 A1* | 11/2017 | Marangon | B62K 23/06 |
| 2018/0154983 A1* | 6/2018 | Marangon | B62M 9/1242 |
| 2018/0178877 A1* | 6/2018 | Marangon | B62L 3/02 |
| 2018/0229805 A1* | 8/2018 | Minto | B62M 9/134 |

FOREIGN PATENT DOCUMENTS

| | | |
|---|---|---|
| EP | 0392457 A1 | 10/1990 |
| EP | 1724189 A2 | 11/2006 |
| EP | 1749738 A1 | 2/2007 |
| EP | 2527240 A1 | 11/2012 |
| JP | 59127127 A | 7/1984 |

\* cited by examiner

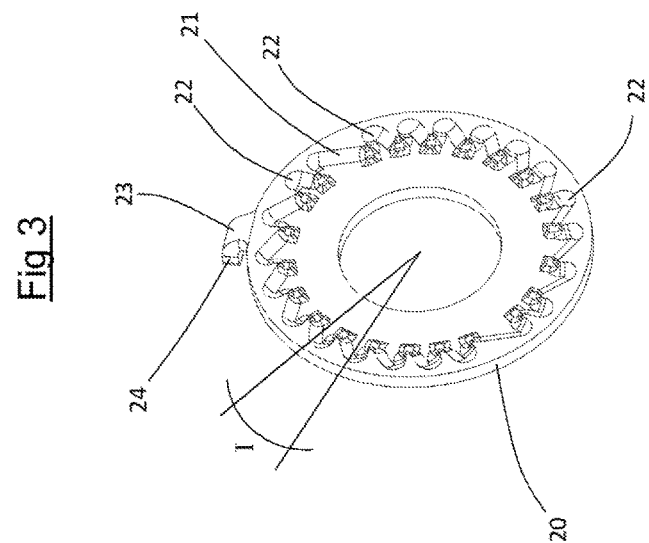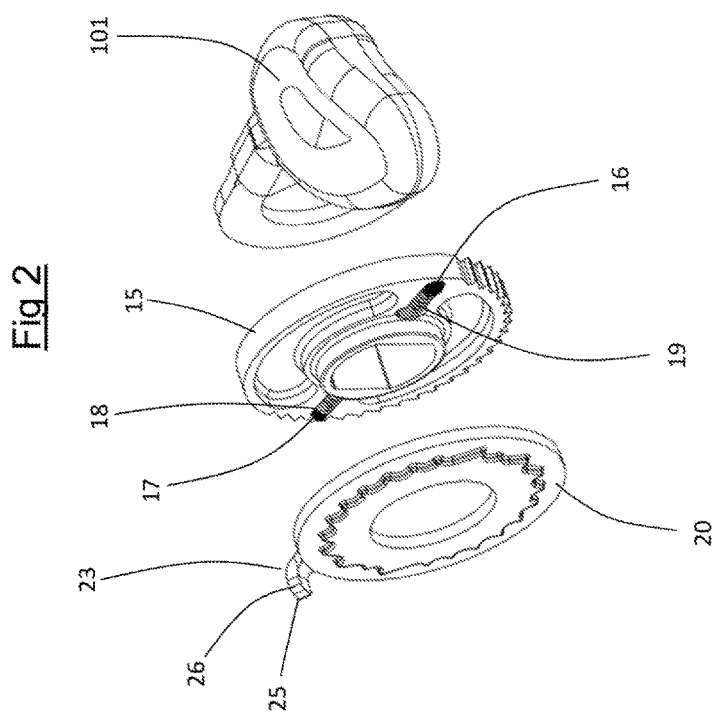

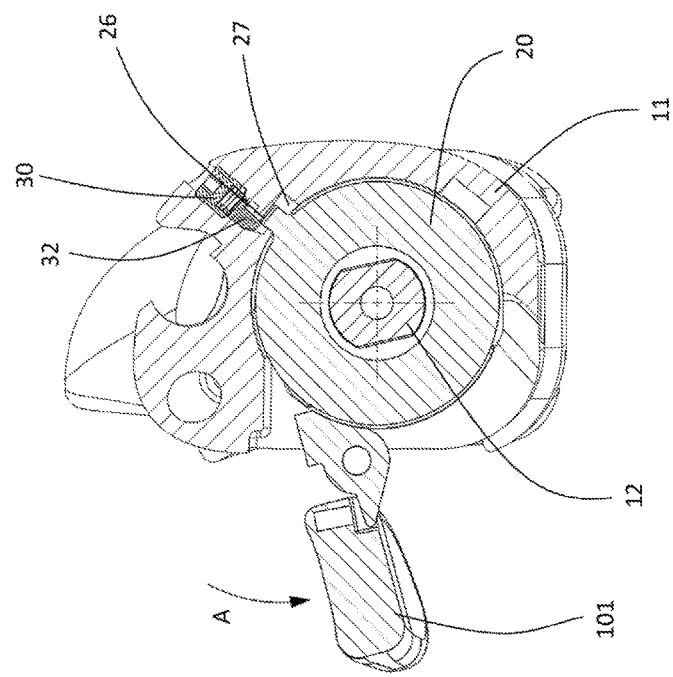
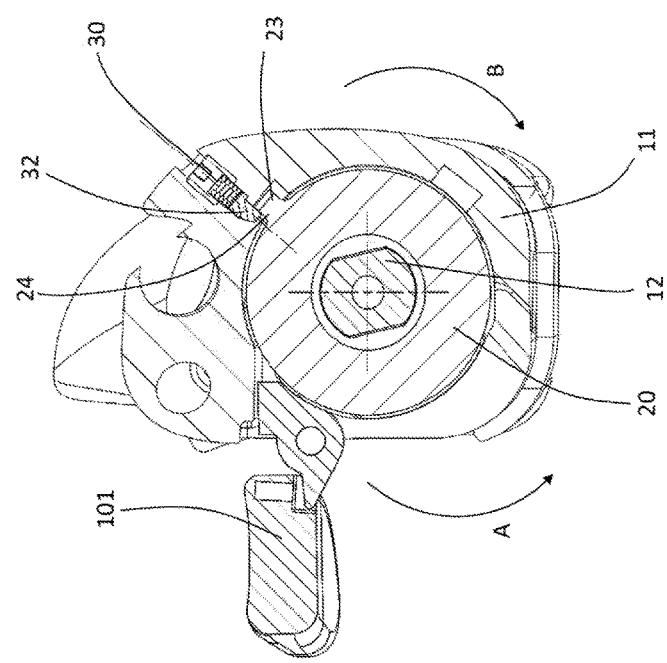
Fig 6
Fig 7

MECHANICAL ACTUATION DEVICE FOR ACTUATING THE CONTROL CABLE OF A BICYCLE DERAILLEUR

CROSS REFERENCE TO RELATED APPLICATION(S)

This application claims the benefit of Italian Application No. 102017000015361, filed on Feb. 13, 2017, which is incorporated herein by reference as if fully set forth.

FIELD OF INVENTION

The present invention relates to a mechanical actuation device for actuating the control cable of a derailleur of a bicycle, adapted for being mounted on bicycle handlebars. Preferably, the bicycle is a racing bicycle.

BACKGROUND

A bicycle is normally provided with a rear derailleur active on a sprocket assembly, which consists of a series of coaxial toothed wheels (sprockets) having different diameters and numbers of teeth coupled with the hub of the rear wheel.

The derailleur engages a transmission chain extending in a closed loop between the sprocket assembly and the crankset, moving it on toothed wheels having a different diameter and number of teeth, so as to obtain different gear ratios.

In particular, downward gearshifting is when the chain passes from a toothed wheel having a larger diameter to a toothed wheel having a smaller diameter, and upward gearshifting is when the chain moves from a toothed wheel having a smaller diameter to a toothed wheel having a larger diameter. Concerning this, it should be noted that with reference to the rear derailleur, downward gearshifting corresponds to the passage to a higher gear ratio and upward gearshifting corresponds to the passage to a lower gear ratio.

The movement in the two directions of the front derailleur is obtained through an actuation device mounted on the handlebars so as to be easy for the cyclist to maneuver.

More specifically, in a mechanical gearshift, the rear derailleur is moved between the toothed wheels of the sprocket assembly, in a first direction by a traction action exerted by a normally sheathed inextensible control cable (commonly called Bowden cable), in a second opposite direction by the release of the traction of the cable and by the elastic return action of a spring provided in the derailleur itself.

The movement of the rear derailleur is carried out according to an articulated parallelogram linkage in which the sides of the parallelogram are articulated to one another in pairs, along respective substantially parallel rotation axes, through pins. In particular, such an articulated parallelogram is formed from a support body, intended to remain fixed with respect to the frame, a so-called chain guide adapted for moving the chain between different engagement positions on the toothed wheels, and a pair of articulation arms or connecting rods (generally identified as outer connecting rod and inner connecting rod), which connect the chain guide to the support body in a movable manner.

The traction of the control cable opposes the action of an elastic spring active in the rear derailleur that tends to push the connecting rods of the derailleur towards the smallest gear of the sprocket assembly, whereas the release of the control cable frees the elastic energy of such a spring.

Therefore, the traction or release of the control cable determine respective rotations of the connecting rods of the derailleur with the consequent movement of the chain guide that makes the chain face the desired toothed wheel for precise gearshifting.

Normally, the direction in which the movement is determined by the release of the traction of the cable and by the return spring is that of downward gearshifting; vice-versa, the traction action of the control cable takes place in the direction of upward gearshifting, wherein the chain moves from a wheel of smaller diameter to a wheel of larger diameter.

In the actuation device, the control cable is actuated in traction or in release through winding and unwinding on a rotor element, commonly called cable-winding bush, the rotation of which is actuated by the cyclist with a suitable control lever, or with two control levers (a first lever for upward gearshifting and a second lever for downward gearshifting).

In order to ensure rapid, reactive and stable gearshifting it is not always suitable, during upward gearshifting, to make the transmission chain perform a single movement of size exactly coinciding with the distance that separates two sprockets.

Indeed, it is often advantageous to move the transmission chain by a greater amount than that which separates two sprockets so that it engages the preselected sprocket quicker, further moving the transmission chain to position it on the sprocket so that it maintains the engagement with it.

The cable-winding bush must therefore be rotated correspondingly during gearshifting to control the movements of the transmission chain.

Examples of mechanical actuation devices that move the transmission chain in many positions with respect to the sprockets before concluding the gearshifting are shown in documents EP2527240A1, U.S. Pat. Nos. 6,216,553, 5,676, 020, 6,367,347, EP1724189 and U.S. Pat. No. 5,787,757.

The actuation device must also have a stationary hold on the cable-winding bush at the end of gearshifting.

This function is obtained with so-called indexers.

One type of indexer provides for a ball-carrying bush rotating as a unit with the cable-winding bush (set in rotation by the control lever) and equipped with a slider which engages a fastening track, equipped with stop positions, formed on an indexing bush. When the slider reaches a stop position, the ball-carrying bush and the cable-winding bush are held in the angular position reached.

In this type of indexer, the indexing bush is mounted with a small rotational play with respect to a casing that rotatably supports the ball-carrying bush and the cable-winding bush. In this way, during the initial step of upward gearshifting the indexing bush rotates with respect to the casing in an angular direction in accordance with the ball-carrying bush forcing the ball-carrying bush (and therefore the cable-winding bush) to carry out an extra rotation to take the slider into the new stop position. This extra rotation determines an extra stroke of the transmission chain during upward gearshifting.

Such extra stroke is completely recovered in the last upward gearshifting step (after the slider is engaged in a new stop position) since the indexing bush recovers the rotational play set in rotation in the opposite direction by the ball-carrying bush (which rotates in the opposite direction by means of the return of the spring of the derailleur).

The recovery of the extra upward stroke is therefore such that, at the end of upward gearshifting, the total angular excursion carried out by the ball-carrying bush (and therefore by the cable-winding bush) is equal to the angular distance that divides two stop positions on the indexing bush.

During downward gearshifting the indexing bush does not rotate, allowing the cable-winding bush to rotate by an angle coinciding with the angle that separates two stop positions on the indexing bush, positioning the transmission chain exactly at the preselected sprocket.

The Applicant has found that upward gearshifting would be further improved in terms of responsiveness and efficiency if the extra upward stroke was not completely recovered, so that the transmission chain can be positioned, when gearshifting has ended, slightly beyond the preselected sprocket and towards the sprocket of immediately greater size.

The Applicant has however found that in an indexer of the type summarily described above, the lack of complete recovery of the extra upward stroke would result in downward gearshifting that would position the transmission chain no longer at the preselected sprocket but in an off-center position with respect to it, in particular moved towards the sprocket of immediately greater diameter, with consequent slow and potentially unstable downward gearshifting.

SUMMARY

The Applicant has found that by arranging a pointer switchable between an active position and a passive position so that the pointer interacts with the indexing bush to selectively limit the angular play thereof, it is possible, as a function of the position taken up by the pointer, to limit both the extent of the rotation that the indexing bush performs in the second angular direction during the actuation of the control lever for upward gearshifting and the extent of the rotation in the first angular direction that the indexing bush performs in the final step of upward gearshifting (by means of the return of the spring of the derailleur).

BRIEF DESCRIPTION OF THE DRAWINGS

The features and advantages of the invention will become clearer from the following description of preferred embodiments thereof, made with reference to the attached drawings. In such drawings:

FIG. 2 is an exploded view of some components of the device of FIG. 1;

FIG. 3 is a perspective view of a component of the exploded view of FIG. 2;

FIGS. 4 to 7 are rear views of the device of FIG. 1 in different operative configurations;

DETAILED DESCRIPTION OF THE PREFERRED EMBODIMENTS

Figure 8:
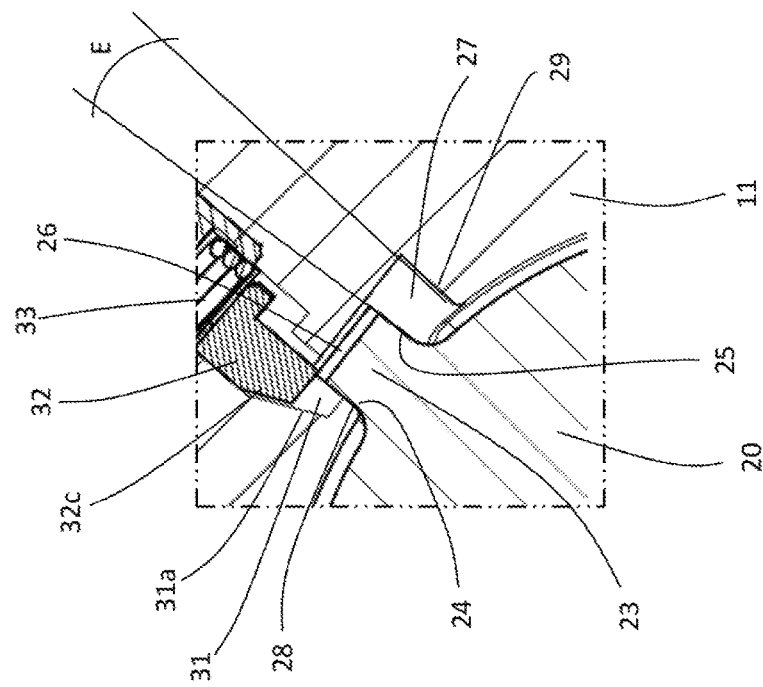
FIG. 8 is an enlarged view of a detail of the device of FIG. 4.

The present invention relates to an actuation device for actuating the control cable of a bicycle gearshift comprising:

a casing, configured for fixing to bicycle handlebars, a control pin rotatably mounted in said casing about a rotation axis, a cable-winding bush mounted coaxially to the control pin and rotatable with the control pin in a first angular direction and in a second angular direction opposite to the first, a ball-carrying bush mounted in the casing in a rotatable manner about the rotation axis, rotating as a unit with said cable-winding bush and equipped with at least one slider;

an indexing bush rotatable with respect to said control pin and mounted in the casing with a rotational play about the rotation axis with respect to said casing, the indexing bush being provided with a fastening track comprising a plurality of stop positions spaced apart by respective indexing angles and engageable in sequence by said slider during a relative rotation between the ball-carrying bush and the indexing bush, each stop position defining a stable angular position for said cable-winding bush;

a pointer switchable between an active position in which it interacts with said indexing bush to limit the angular play thereof with respect to the casing and a passive position in which it does not interact with the indexing bush and it does not limit the angular play between the indexing bush and the casing.

The cable-winding bush is set in rotation by the cyclist by acting on a control lever (or two dedicated control levers) which, since it rotates as a unit with the control pin, sets the control pin and the cable-winding bush in rotation.

The slider of the ball-carrying bush, when engaged in a stop position of the fastening track of the indexing bush, allows the ball-carrying bush and the cable-winding bush (rotating as a unit with it) to remain in stable angular positions.

Rotations of the cable-winding bush in the first angular direction correspond to releases of the control cable that determine movements of the derailleur towards downward gearshifting.

Rotations of the cable-winding bush in the second angular direction correspond to tightening of the control cable that determines movement of the derailleur towards upward gearshifting.

The angular play of the indexing bush with respect to the casing allows a further rotation of the ball-carrying bush (in addition to the rotation between two indexing angles), and therefore of the cable-winding bush, with respect to the fixed casing carrying out an extra stroke of the derailleur during upward gearshifting.

By arranging a pointer switchable between an active position and a passive position so that the pointer interacts with the indexing bush to selectively limit the angular play thereof, it is possible, as a function of the position taken up by the pointer, to limit both the extent of the rotation that the indexing bush performs in the second angular direction during the actuation of the control lever for upward gearshifting and the extent of the rotation in the first angular direction that the indexing bush performs in the final step of upward gearshifting (by means of the return of the spring of the derailleur).

In this way, it is possible to completely recover the extra rotation of the cable-winding bush or only recover a part of such an extra rotation as a function of the position taken up by the pointer. Furthermore, as a function of the position taken up by the pointer, it is possible to limit the extra rotation of the cable-winding bush and thus the extent of the extra stroke during upward gearshifting.

This makes it possible to choose the position taken up by the pointer so as to ensure that during downward gearshifting the derailleur is always positioned in the same position with respect to the current reference sprocket (for example always perfectly centered on it) and that, during upward gearshifting, the recovery of the extra upward stroke is such as to position the derailleur always slightly beyond the reference sprocket by a predetermined amount.

Both downward gearshifting and upward gearshifting are therefore responsive and efficient.

The rotation axis of the control pin is the main reference axis for the elements that belong to the device of the present invention; all of the indications of direction and similar, such as "axial", "radial", "circumferential", "diametral", will refer to it; equally, the indications "outwards" and "inwards" referring to radial directions must be taken to mean away from the axis or towards the axis. The two opposite angular directions are also defined about the axis.

The mechanical actuation device for actuating the control cable of a derailleur of a bicycle of the present invention can comprise one or more of the following preferred features, taken individually or in combination.

Preferably, the limitation in the angular play of the indexing bush is given by an angle equal to the difference between the maximum angular excursion of the indexing bush when the pointer is in the passive position and the maximum angular excursion of the indexing bush when the pointer is in the active position.

Such an angle, which will also be called "delta" hereinafter, is directly proportional to the predetermined amount with which the rear derailleur is positioned beyond the predetermined toothed wheel at the end of upward gearshifting.

Preferably, said pointer is switched from the active position to the passive position during a controlled rotation of the control pin in the first angular direction immediately after a controlled rotation of the control pin in the second angular direction.

In this way, a downward gearshifting operation that follows an upward gearshifting operation (which will also be called "first downward gearshifting operation" hereinafter) is such that the indexing bush, and with it the ball-carrying bush and the cable-winding bush, performs a rotation in the first angular direction greater than the indexing angle that separates two stop positions.

This makes it possible to stably position the derailleur, following upward gearshifting, beyond the preselected toothed wheel (and in particular towards the toothed wheel having immediately larger diameter) by the amount "delta", since the subsequent downward gearshifting recovers such an amount "delta" taking the derailleur back centered on the preselected toothed wheel.

Preferably, said pointer is switched from the passive position to the active position during a controlled rotation of the control pin in the second angular direction immediately after a controlled rotation of the control pin in the first angular direction.

In this way, an upward gearshifting operation that follows a downward gearshifting operation (which will also be called "first upward gearshifting operation" hereinafter) is such that the indexing bush, and with it the ball-carrying bush and the cable-winding bush, performs a rotation in the second angular direction greater than the indexing angle that separates two stop positions, in particular greater than the amount "delta".

Preferably, said pointer remains in the passive position during a controlled rotation of the control pin in the first angular direction immediately after a previous controlled rotation of the control pin in the first angular direction.

In this way, the upward gearshifting operations that immediately follow the first upward gearshifting operation move the derailleur only by the indexing angle, transferring the "delta" of the first upward gearshifting operation also to the subsequent upward gearshifting operations.

Preferably, said pointer remains in the active position during a controlled rotation of the control pin in the second angular direction immediately after a previous controlled rotation of the control pin in the second angular direction.

In this way, the downward gearshifting operations that immediately follow the first downward gearshifting operation move the derailleur by only the indexing angle, since the "delta" has already been recovered by the first downward gearshifting operation.

Preferably, said indexing bush comprises a radial appendage inserted in an abutment seat of the casing; said radial appendage having a shorter extension in the circumferential direction than the extension in the circumferential direction of the abutment seat of the casing so as to make said rotational play between said indexing bush and said casing.

In this way, the indexing bush can rotate with respect to the fixed casing.

Preferably, said appendage is delimited by a first radial wall and a second radial wall; said abutment seat comprising a first wall and a second wall respectively defining a first and a second end stop for the rotation of the indexing bush with respect to the casing.

Preferably, said pointer is slidably mounted in a radial housing formed in said casing; said radial housing having a radially inner end open on said abutment seat of the casing.

In this way the pointer, when in active position, can insert into the abutment seat and interfere with the radial appendage of the indexing bush.

Preferably, in said active position said pointer is at least partially inserted in said abutment seat of the casing and defines a third end stop, for the rotation of the indexing bush with respect to the casing, arranged between said first and second end stop.

In this way, the pointer, when in the active position, limits the angular excursion of the indexing bush.

Preferably, said pointer comprises a head and an elastic member active on said head to push the head in a radially inner direction in said radial housing.

In this way, when not impeded by the radial appendage of the indexing bush, the pointer is switched into the active position.

Preferably, said head is substantially wedge-shaped and is in contact with an inclined wall of the radial housing; said head sliding on said inclined wall in opposition to said elastic member when a force is applied on the head of the pointer directed along said first angular direction.

In this way, the first radial wall of the radial appendage of the indexing bush switches the pointer into the passive position when the radial appendage is pushed with a sufficient force against the head of the pointer.

With reference to the drawing figures, a preferred embodiment of the mechanical actuation device for actuating the control cable of a bicycle derailleur in accordance with the present invention is described in further detail. The mechanical actuation device is wholly indicated with 10.

Figure 1:
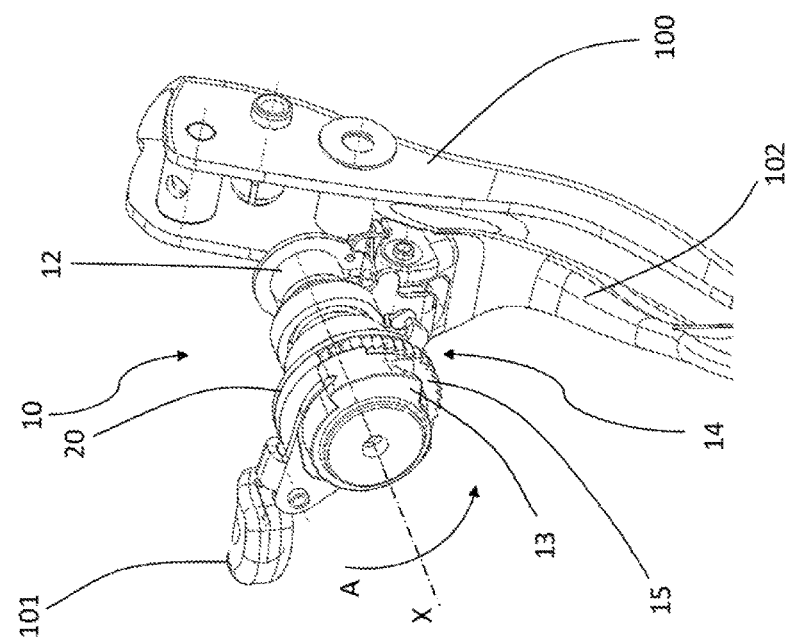
FIG. 1 is a perspective view of a mechanical actuation device for actuating the control cable of a bicycle derailleur according to the invention.

The device 10 comprises a casing 11, shown wholly in FIG. 11, that is fixed to the handlebars of a bicycle in a conventional manner, for example through a strap that preferably also constrains a brake lever 100 (partly visible in FIG. 1) to the handlebars.

In the casing 11 there is a control pin 12, rotatable inside the casing 11 about a rotation axis X. About the rotation axis X, two opposite angular directions are defined, a first A and a second angular direction B, respectively.

The control pin 12 is angularly rotatable about the rotation axis X in the first A and in the second angular direction B between a first angular position and a last angular position. The first and the last angular position of the control pin 12 are delimited by end stops preferably fixedly connected to the casing 11.

The control pin 12 is set in rotation, preferably by a dedicated control 101, to rotate in the first angular direction A and, preferably by a dedicated actuation lever 102, to rotate in the second angular direction B.

The device 10 further comprises a cable-winding bush 13, to which a control cable (not illustrated) is fixed and on which it is wound, at a first end. The other end of the control cable is fixed to the rear derailleur (not illustrated) so as to control the movement thereof with respect to the toothed wheels of a sprocket assembly 200.

The cable-winding bush 13 is mounted in the casing and is angularly rotatable about the rotation axis X in the first A and in the second angular direction B. The cable-winding bush 13 can rotate between a first angular position in which the winding of the control cable is minimum and a last angular position in which the winding of the control cable is maximum, and vice-versa.

Every angular position of the cable-winding bush 13 corresponds to an angular position of the rear derailleur with respect to the toothed wheels of the sprocket assembly 200.

In particular, the first angular position of the cable-winding bush 13 corresponds to a positioning of the transmission chain at the smallest toothed wheel 201 of the sprocket assembly 200. The last angular position of the cable-winding bush 13 corresponds to a positioning of the transmission chain at the largest toothed wheel 211 (in other words of largest diameter) of the sprocket assembly 200. Intermediate positions of the cable-winding bush 13 correspond to positioning of the transmission chain on intermediate toothed wheels 202, 203, 204, 205, 206, 207, 208, 209, 210 of the sprocket assembly 200.

The cable-winding bush 13 rotates as a unit with the control pin 12 in the entire angular excursion of the cable-winding bush 13 between the first and the last angular position (and vice-versa), so that the actuation of the control pin 12 by the cyclist determines useful gearshifting of the rear derailleur.

In particular, rotations in the first angular direction A of the control pin 12 correspond to downward gearshifting, in other words gearshifting that moves the derailleur on progressively smaller toothed wheels of the sprocket assembly 200, whereas rotations in the second angular direction B of the control pin 12 correspond to upward gearshifting, in other words gearshifting that moves the derailleur on progressively larger toothed wheels of the sprocket assembly 200.

The device 10 further comprises an indexer 14 to allow the control pin 12 (and therefore the cable-winding bush 13) to take up stable angular positions.

The indexer 14 comprises a ball-carrying bush 15 mounted in the casing 11 in a rotatable manner about the rotation axis X. The ball-carrying bush 15 is equipped with a first slider 16 and a second slider 17 (FIG. 2). The two sliders 16, 17 are preferably spherical bodies.

Each slider 16, 17 is radially slidable in respective opposite radial throats 18 formed in the ball-carrying bush 15. The two sliders 16, 17 are elastically biased outwards in the throats 18 by respective springs 19 mounted in the throats 18. The springs 19 position the sliders 16, 17 at the radially outer end of the respective throat 18. The throats 18 are open on one side of the ball-carrying bush 15 so that the sliders 16, 17 emerge partially from the axial bulk of the ball-carrying bush 15, making sliders projecting in the axial direction.

The indexer 14 further comprises an indexing bush 20 provided with a fastening track 21 (FIG. 3). The two sliders 16, 17 are engaged on the fastening track 21.

The fastening track 21 directly faces the ball-carrying bush 15 so that the sliders 16, 17 engage the fastening track 21. The axial depth of the fastening track 21 is such as to receive the portion of sliders 16, 17 that emerges axially from the ball-carrying bush 15.

The fastening track 21 comprises stop positions 22 engageable in sequence by the two sliders 16, 17. The stop positions 22 determine stable positions for the sliders along the fastening track 21 and are spaced apart by indexing angles I preferably not identical to one another.

Preferably, the fastening track 21 is operatively divided into two half-parts each of which is engaged by a respective slider 16, 17, so that identical stop areas 22 are angularly spaced by 180°.

When the ball-carrying bush 15 rotates with respect to the indexing bush 20, each slider 16, 17 passes from one stop position 22 to an adjacent stop position 22 taking the ball-carrying bush 15 into a new stable angular position.

In particular, during downward gearshifting, the ball-carrying bush 15 rotates with respect to the indexing bush 21 in the first angular direction A and the two sliders 16, 17 slide in the fastening track 21 and reach a new stop position 22.

The indexing bush 20 is mounted on the control pin 12 so as to rotate freely with respect to it.

The indexing bush 20 comprises a radial appendage 23 which projects radially outside of the generally cylindrical shape of the indexing bush 20.

The radial appendage 23 is delimited in the circumferential direction by a first radial wall 24 and a second radial wall 25 preferably parallel to one another. In the radially outer direction the radial appendage 23 is delimited by a top wall 26 that joins the two radial walls 24, 25 (FIG. 3).

The radial appendage 23 is configured to insert in an abutment seat 27 (FIG. 8) formed in the casing 11. The abutment seat 27 is delimited circumferentially by a first abutment wall 28 and a second abutment wall 29 and has a greater radial extension that the radial extension of the radial appendage 23, so as to contain it.

The radial appendage 23 has a shorter circumferential extension than the circumferential extension of the abutment seat 27, so that the radial appendage 23 is inserted in the abutment seat 27 allowing an angular play of the indexing bush 20 with respect to the casing 11.

As illustrated in FIG. 8, the first radial wall 24 of the radial appendage 23 faces the first abutment wall 28 of the abutment seat 27 and the second radial wall 25 faces the second abutment wall 29, so that the abutment walls 28, 29 define a respective first and second end stop for the rotation of the indexing bush 20 with respect to the casing 11.

The angular distance (angle) E indicated in FIG. 8 is given by the difference between the angular extensions in the circumferential direction between the abutment seat 27 and the radial appendage 23.

Figure 9:
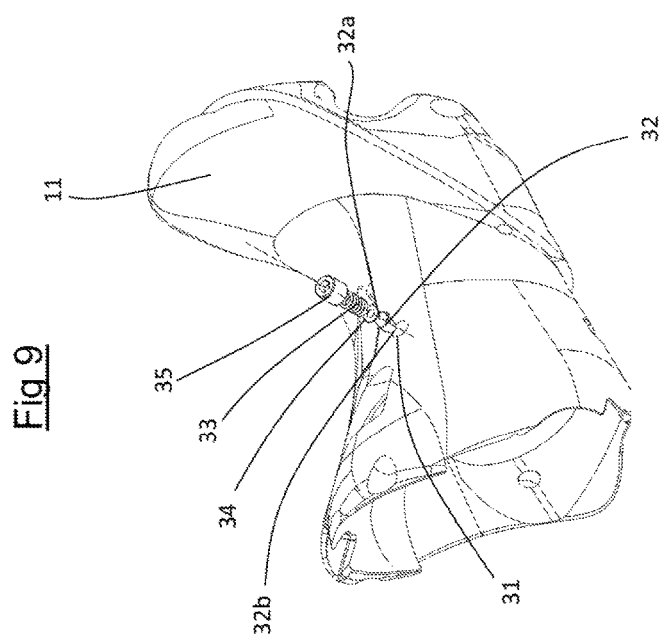
FIG. 9 is a perspective view of the device of FIG. 1 with some parts removed to better highlight others.

The device 10 further comprises a pointer 30, illustrated in an exploded view in FIG. 9.

The pointer 30 is inserted in a radially-extending housing 31 of the casing 11. In the preferred embodiment of the invention, the housing 31 is made by a hole open on the outside of the casing 11 and opening into the abutment seat 27 close to the first abutment wall 28.

The pointer 30 comprises a head 32 which has a radially outer end 32a on which an elastic member 33 (for example a linear spring) acts after possible interposition of a washer 34 between the elastic member 33 and the head 32 of the pointer 30.

A preload dowel 35 acts on the elastic member 33, and by acting on said dowel 35 it is possible to set the thrust that the elastic member 33 exerts on the head 32 of the pointer 30.

From the radially inner end 32b of the head 32 of the pointer 30 an inclined side wall 32c of the head 32 extends, so as to define a substantial wedge shape of the head 32 (FIG. 8).

Close to the abutment seat 27, the housing 31 for the pointer 30 has an inclined wall 31a on which the head 32 of the pointer 30 can slide making a direct movement in the radial direction inside the housing 31.

When the pointer 30 is completely inserted in the housing 31, the head 32 of the pointer is partially inserted in the abutment seat 27, projecting in the circumferential direction from the first abutment wall 28.

In other words, when the pointer 30 is completely inserted in the housing 31, the head 32 of the pointer 30 limits the circumferential extension of the abutment seat 27 replacing the first abutment wall 28 and defining a third end stop for the rotation of the indexing bush 20 with respect to the casing 11.

Figure 5:
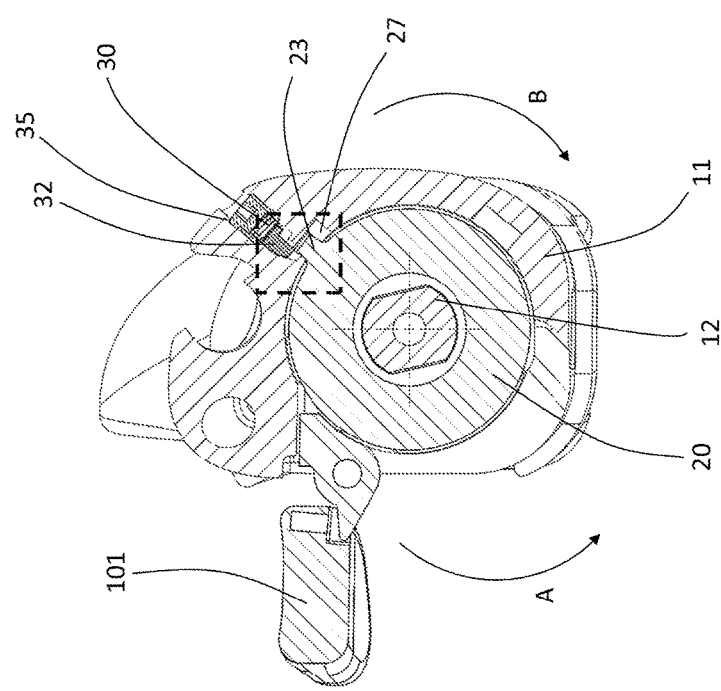

In this position, the pointer 30 occupies an angular portion D of the abutment seat 27, in other words it extends inside the abutment seat 27 for an angle D (FIG. 5), also defined as angle "delta".

The position of complete insertion of the pointer 30 in the housing 31 defines an active position of the pointer 30.

When the pointer 30 is lifted with respect to the active position (condition for example illustrated in FIG. 8), the head 32 of the pointer 30 does not interfere with the abutment seat 27.

The head 32 is in abutment against the top wall 26 of the radial appendage 23 which holds the pointer 30 lifted in opposition to the action of the elastic members 33 (FIG. 8).

This position of the pointer 30 defines a passive position thereof.

The switching of the pointer 30 between the active and passive condition and vice-versa is actuated by the rotation of the indexing bush 20 with respect to the casing 11, as will become clear from the following description of the operation of the device 10.

In rest condition, in other words when the cyclist does not actuate the device 10 to carry out gearshifting, as stated above the ball-carrying bush 15 is engaged, through the sliders 16, 17, with the indexing bush 20. The indexing bush 20 and the ball-carrying bush 15 thus rotate as a unit. In this operative configuration, the elastic return force of the rear derailleur (obtained by a spring that opposes the deformation of the articulated quadrilateral that makes the rear derailleur) tends to set the cable-winding bush 13 in rotation in the first angular direction A. The cable-winding bush 13 transmits such a rotation, through the control pin 12, to the ball-carrying bush 15 and thus to the indexing bush 20.

In the rest condition of the device 10, the first radial wall 24 of the radial appendage 23 is pushed in the direction of the first abutment wall 28 of the abutment seat 27.

In the rest condition of the device 10 and when the pointer 30 is in the passive position, the first radial wall 24 of the radial appendage 23 is in abutment against the first abutment wall 28 of the abutment seat 27 (for example as shown in FIG. 8).

When the pointer 30 is in the active position, the first radial wall 24 of the radial appendage 23 is in abutment against the head 32 of the pointer 30 (for example as shown in FIG. 6).

The device 10 is set so that when the cable-winding bush 13 is in the first angular position, the pointer 30 is in the passive position.

It should be noted that such an angular position of the cable-winding bush 13 corresponds to a positioning of the rear derailleur at the smallest toothed wheel 201 of the sprocket assembly 200.

Starting from this configuration (illustrated in FIG. 4), the cyclist can actuate the device 10 to carry out upward gearshifting, and in particular the control pin 12 is set in rotation (through the actuation of the actuation lever 102) in the second angular direction B.

The control pin 12 sets the ball-carrying bush 15 and the cable-winding bush 13 in rotation in the second angular direction B. The ball-carrying bush 15 sets the indexing bush 20 in rotation since the sliders 16, 17 of the ball-carrying bush 15 are engaged in respective stop position 22 on the fastening track 21 of the indexing bush 20.

The ball-carrying bush 20 rotates in the second angular direction B through the rotational play present between it and the casing 11.

When the second radial wall 25 of the radial appendage 23 of the indexing bush 20 goes into abutment against the second abutment wall 29 of the abutment seat 27 of the casing (condition illustrated in FIG. 5), a further rotation of the indexing bush in the second angular direction B is prevented. In this position, the cable-winding bush 13 has travelled an angular excursion in the second angular direction B of size equal to the angle E (difference between the angular extension of the abutment seat 27 and of the radial appendage 23).

In this position (not stable and not maintained) of the cable-winding bush 13, the derailleur has moved towards the immediately larger toothed wheel 202 by an amount proportional to E.

The action of the cyclist continues (in opposition to the spring of the rear derailleur) and the further rotation of the control pin 12 in the second angular direction B releases the sliders 16, 17 of the ball-carrying bush 15 from the stop positions 22 of the fastening track 21 of the indexing bush 20. The rotation of the control pin 12, of the ball-carrying bush and of the cable-winding bush 13 in the second angular direction B continues until the sliders 16, 17 engage stably in successive stop positions 22 of the fastening track 21.

In this position, the cable-winding bush has carried out a further rotation in the second angular direction of size I (equal to the indexing angle that separates the two stop positions).

In this position (not stable and not maintained) of the cable-winding bush 13, the derailleur has moved towards the immediately larger toothed wheel 202 by a total amount proportional to E+I.

Such a movement of the derailleur is greater than the indexing angle that separates the two stop positions engaged, so as to make an extra upward stroke and facilitate the engagement of the toothed wheel of immediately larger diameter.

During the rotations in the second angular direction B described above, the pointer 30 has switched into the active position, since the head 32 thereof is no longer supported by the top wall 26 of the radial appendage 23 of the indexing bush 20.

The release of the actuation control by the cyclist means that the return action of the rear derailleur, in other words of the spring that opposes the deformation of the rear derailleur, sets the cable-winding bush 13 and with it the ball-carrying bush 15 in rotation in the first angular direction A. The latter sets the indexing bush 20 in rotation which, in this position, is free to rotate in the first angular direction A with respect to the casing 11.

The rotation in the first angular direction A continues until the radial appendage 23 makes contact with the third end stop, in other words the end stop offered by the head 32 of the pointer 30 that has taken up the active position inside the abutment seat 27.

It should be noted that the return force of the spring of the rear derailleur is not sufficient to make the wedge-shaped portion of the head 32 of the pointer 30 slide along the inclined wall 31a of the housing 31. The elastic member 33 opposes such sliding and is sized so as not to deform under the load given by the return spring of the rear derailleur.

In this position (stable and maintained), the cable-winding bush 13 has travelled an angular excursion in the first angular direction A by an amount equal to the angle E (difference between the angular extension of the abutment seat 27 and of the radial appendage 23) minus the angle D (angular extension of the pointer 30 inside the abutment seat 27).

Therefore, the net angular excursion of the cable-winding bush after the first upward gearshifting operation is E+I−(E−D), in other words I+D.

Figure 10:
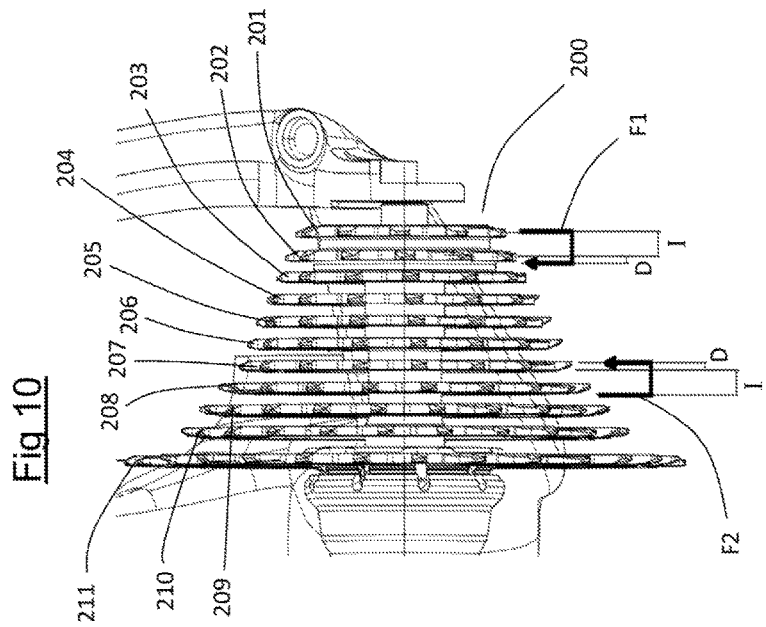
FIG. 10 is a view of a sprocket assembly on which the device of FIG. 1 is active.

The derailleur has moved beyond the toothed wheel 202, stopping in a position slightly beyond it, by a total amount proportional to I+D, as shown by the arrow F1 in FIG. 10.

From the position reached, a further upward gearshifting operation commanded by the cyclist sets the control pin 12 in rotation in the second angular direction B.

As stated, the ball-carrying bush 15 sets the indexing bush 20 in rotation, which rotates in the second angular direction B by means of the rotational play present between it and the casing 11.

When the second radial wall 25 of the radial appendage 23 of the indexing bush 20 goes into abutment against the second abutment wall 29 of the abutment seat 27 of the casing, the indexing bush 20 stops rotating. In this position, the cable-winding bush 13 has travelled an angular excursion in the second angular direction B by an amount equal to the angle E (difference between the angular extension of the abutment seat 27 and of the radial appendage 23) minus the angle D (angular extension of the pointer 30 inside the abutment seat 27), since the pointer 30 was in the active position before the start of upward gearshifting.

In this position (not stable and not maintained) of the cable-winding bush 13, the derailleur has moved towards the immediately larger toothed wheel 202 by an amount proportional to E-D.

The action of the cyclist continues (in opposition to the spring of the rear derailleur) and the further rotation of the control pin 12 in the second angular direction B takes the sliders 16, 17 into engagement on successive stop positions 22 of the fastening track 21 of the indexing bush 20.

In this position, the cable-winding bush has carried out a further rotation in the second angular direction by an amount I (equal to the indexing angle that separates the two stop positions).

In this position (not stable and not maintained) of the cable-winding bush 13, the derailleur has moved towards the immediately larger toothed wheel 202 by a total amount proportional to E−D+I.

Such movement of the derailleur is greater than the indexing angle that separates the two stop positions engaged, so as to make an extra upward stroke and facilitate the engagement of the toothed wheel of immediately greater diameter.

During the rotations in the second angular direction B described above, the pointer 30 stayed in the active position.

The release of the actuation control by the cyclist means that the return action of the rear derailleur sets the cable-winding bush 13 and with it the ball-carrying bush 15 in rotation in the first angular direction A. The latter sets the indexing bush 20 in rotation, which, in this position, is free to rotate in the first angular direction A with respect to the casing 11.

The rotation in the first angular direction A continues until the radial appendage 23 makes contact with the head 32 of the pointer in the active position inside the abutment seat 27.

In this position (stable and maintained), the cable-winding bush 13 has travelled an angular excursion in the first angular direction A by an amount equal to the angle E (difference between the angular extension of the abutment seat 27 and of the radial appendage 23) minus the angle D (angular extension of the pointer 30 inside the abutment seat 27).

Therefore, the net angular excursion of the cable-winding bush 13 after the second upward gearshifting operation is E−D+I−(E−D), in other words I, in other words exactly equal to the indexing angle.

The derailleur has moved beyond the toothed wheel 203, stopping in a position slightly beyond it, by a total amount proportional to I, keeping the same distance from the toothed wheel engaged that it had before the second upward gearshifting operation.

Further upward gearshifting operations repeat the sequence of operations described above in relation to the second upward gearshifting operation, carrying out winding of the cable-winding bush 13 by net angles equal to I (indexing angle).

From the position reached (or from that reached following any upward gearshifting operation), the first downward gearshifting operation is carried out from the configuration illustrated in FIG. 6, in other words with the pointer 30 in active position.

Starting, for example, from a toothed wheel 208 and wishing to reach the toothed wheel 207 of immediately smaller size, the cyclist actuates the control 101 that sets the control pin 12 in rotation in the first angular direction A.

The control pin 12 sets both the cable-winding bush 13 and the ball-carrying bush 15 in rotation. The latter, as stated above, sets the indexing bush 20 in rotation through the engagement of the sliders 16, 17 in the stop positions 22.

The indexing bush 20 is immediately counteracted in the rotation along the first angular direction A by the abutment of the first radial wall 24 of the radial appendage 23 against the head 32 of the pointer 30.

In this situation, the force exerted by the cyclist on the control 101 and transferred to the control pin 12 and to the indexing bush 20 (by means of the ball-carrying bush 15) is such as to make the wedge-shaped portion of the head 32 of the pointer 30 slide along the inclined wall 31a of the housing 31 in opposition to the elastic member 33 (which compresses).

The pointer 30 is thus switched into the passive position.

Concerning this, the elastic member 33 is selected so as to elastically deform (compressing and allowing the pointer 30 to reach the passive position) before the forces that are transmitted from the ball-carrying bush 15 to the indexing bush 20 allow the sliders 16, 17 to disengage from the stop positions 22.

In other words, the force necessary to disengage the sliders 16, 17 from the stop positions 22 occupied is greater than the force necessary to elastically deform the elastic member 33.

The indexing bush 20 therefore rotates in the first angular direction A until the first radial wall 24 of the radial appendage 23 of the indexing bush 20 goes into abutment against the first abutment wall 28 of the abutment seat 27 of the casing 11.

In this position, the cable-winding bush 13 has travelled an angular excursion in the first angular direction A by an amount equal to the angle D (angular extension of the pointer 30 inside the abutment seat 27).

In this position (not stable and not maintained) of the cable-winding bush 13, the derailleur has moved towards the immediately smaller toothed wheel 207 by an amount proportional to D (FIG. 7).

The action of the cyclist continues and the further rotation of the control pin 12 in the first angular direction A takes the sliders 16, 17 into engagement on successive stop positions 22 of the fastening track 21 of the indexing bush 20.

In this position, the cable-winding bush has carried out a further rotation in the first angular direction of size I (equal to the indexing angle that separates the two stop positions).

The derailleur has moved towards the immediately smaller toothed wheel 207 by a total amount proportional to D+I, as indicated by the arrow F2 in FIG. 10.

Such a movement of the derailleur is greater than the indexing angle that separates the two stop positions engaged and in particular is equal to the movement (in the opposite direction) of the derailleur after the first upward gearshifting operation, so as to position the derailleur at the toothed wheel 207 obtaining a precise downward gearshifting operation.

The release of the control 101 by the cyclist leaves the position reached by the cable-winding bush 13 and by the ball-carrying bush 15 unchanged.

Figure 4:
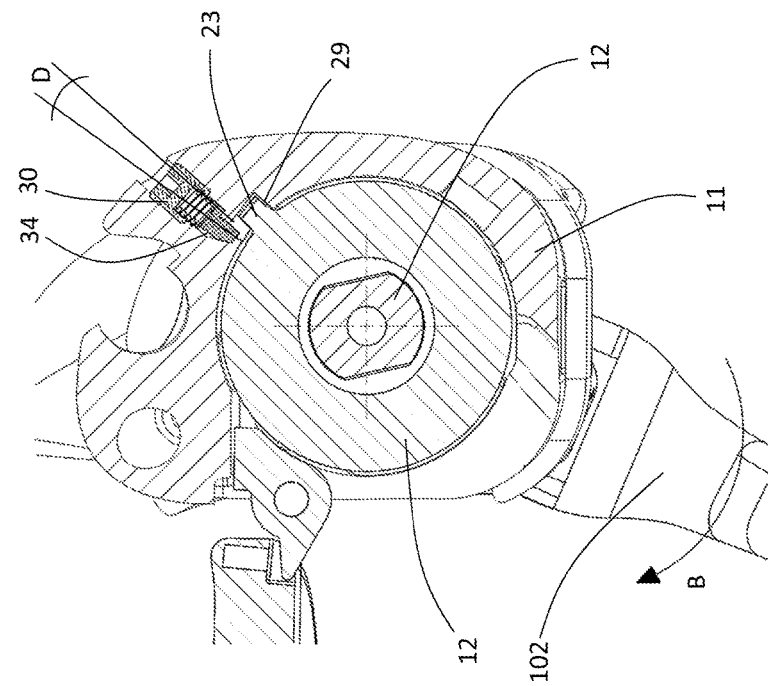

The position of the indexing bush 20 and of the pointer 30 at the end of the first downward gearshifting operation is that illustrated in FIG. 4, in other words the pointer 30 is in passive position and the radial appendage 23 of the indexing bush 20 is in abutment on the first abutment wall 28 of the abutment seat 27.

Further downward gearshifting operations start from a configuration in which the pointer 30 is in the passive position and end with the pointer 30 still in the passive position without it taking up intermediate configurations in the active position.

Therefore, further downward gearshifting operations rotate the cable-winding bush 13 in the first angular direction A by an amount equal to I (indexing angle).

The derailleur moves towards an immediately smaller toothed wheel by a total amount proportional to I, continuing to center on the toothed wheel reached.

An upward gearshifting operation after a downward gearshifting operation is carried out by following what is stated above with reference to the first upward gearshifting operation (passive initial position of the pointer 30 and active final position thereof).

From the above it can be understood that the pointer 30 is switched from the active position to the passive position during a downward gearshifting operation after an upward gearshifting operation.

The pointer 30 is switched from the passive position to the active position during an upward gearshifting operation after a downward gearshifting operation.

The pointer 30 remains in the passive position during a downward gearshifting operation after a downward gearshifting operation.

The pointer 30 remains in the active position during an upward gearshifting operation after an upward gearshifting operation.

Of course, those skilled in the art can bring numerous modifications and variants to the invention described above, in order to satisfy specific and contingent requirements, like for example using the device 10 in combination with a front derailleur, all in any case encompassed by the scope of protection of the present invention as defined by the following claims.

What is claimed is:

1. An actuation device for actuating a control cable of a gearshift of a bicycle, comprising:
   a casing, configured for fixing to bicycle handlebars,
   a control pin rotatably mounted in said casing about a rotation axis (X),
   a cable-winding bush mounted coaxially to the control pin and rotatable with the control pin in a first angular direction and in a second angular direction opposite to the first angular direction,
   a ball-carrying bush mounted in the casing in a rotary manner about the rotation axis (X), rotating as a unit with said cable-winding bush and equipped with at least one slider;
   an indexing bush rotatable with respect to said control pin and mounted in the casing with a rotational play about the rotation axis (X) with respect to said casing, the indexing bush being provided with a fastening track comprising a plurality of stop positions spaced apart by respective indexing angles (I) and engageable in sequence by said slider during a relative rotation between the ball-carrying bush and the indexing bush, each stop position defining a stable angular position for said cable-winding bush; and
   a pointer switchable between an active position in which the pointer interacts with said indexing bush to limit angular play thereof with respect to the casing and a passive position in which the pointer does not interact with the indexing bush and does not limit the angular play between the indexing bush and the casing.

2. The actuation device according to claim 1, wherein said pointer is switched from the active position to the passive position during a controlled rotation of the control pin in the first angular direction immediately after a controlled rotation of the control pin in the second angular direction.

3. The actuation device according to claim 1, wherein said pointer is switched from the passive position to the active position during a controlled rotation of the control pin in the second angular direction immediately after a controlled rotation of the control pin in the first angular direction.

4. The actuation device according to claim 1, wherein said pointer remains in the passive position during a controlled rotation of the control pin in the first angular direction immediately after a previous controlled rotation of the control pin in the first angular direction.

5. The actuation device according to claim 1, wherein said pointer remains in the active position during a controlled rotation of the control pin in the second angular direction immediately after a previous controlled rotation of the control pin in the second angular direction.

6. The actuation device according to claim 1, wherein said indexing bush comprises a radial appendage inserted in an abutment seat of the casing; said radial appendage having a shorter extension in a circumferential direction than an extension in the circumferential direction of the abutment seat of the casing so as to make said rotational play between said indexing bush and said casing.

7. The actuation device according to claim 6, wherein said radial appendage is delimited by a first radial wall and a second radial wall; and said abutment seat comprising a first abutment wall and a second abutment wall respectively defining a first and a second end stop for the rotation of the indexing bush with respect to the casing.

8. The actuation device according to claim 7, wherein said pointer is slidably mounted in a radial housing formed in said casing; said radial housing having a radially inner end open on said abutment seat of the casing.

9. The actuation device according to claim 8, wherein, in said active position, said pointer is at least partially inserted in said abutment seat of the casing and defines a third end stop, for the rotation of the indexing bush with respect to the casing, arranged between said first and second end stop.

10. The actuation device according to claim 8, wherein said pointer comprises a head and an elastic member active on said head to push the head in a radially inner direction in said radial housing.

11. The actuation device according to claim 10, wherein said head is substantially wedge-shaped and is in contact with an inclined wall of the radial housing; said head sliding on said inclined wall in opposition to said elastic member when a force is applied on the head of the pointer directed along said first angular direction.

12. The actuation device according to claim 1, wherein the limitation in the angular play of the indexing bush is given by an angle (D) equal to the difference between a maximum angular excursion of the indexing bush when the pointer is in the passive position and a maximum angular excursion of the indexing bush when the pointer is in the active position.

13. The actuation device according to claim 12, wherein said pointer is switched from the active position to the passive position during a controlled rotation of the control pin in the first angular direction immediately after a controlled rotation of the control pin in the second angular direction.

14. The actuation device according to claim 12, wherein said pointer is switched from the passive position to the active position during a controlled rotation of the control pin in the second angular direction immediately after a controlled rotation of the control pin in the first angular direction.

15. The actuation device according to claim 12, wherein said pointer remains in the passive position during a controlled rotation of the control pin in the first angular direction immediately after a previous controlled rotation of the control pin in the first angular direction.

16. The actuation device according to claim 12, wherein said pointer remains in the active position during a controlled rotation of the control pin in the second angular direction immediately after a previous controlled rotation of the control pin in the second angular direction.

17. The actuation device according to claim 12, wherein said indexing bush comprises a radial appendage inserted in an abutment seat of the casing; said radial appendage having a shorter extension in a circumferential direction than an extension in the circumferential direction of the abutment seat of the casing so as to make said rotational play between said indexing bush and said casing.

18. The actuation device according to claim 17, wherein said radial appendage is delimited by a first radial wall and a second radial wall; and said abutment seat comprising a first abutment wall and a second abutment wall respectively defining a first and a second end stop for the rotation of the indexing bush with respect to the casing.

19. The actuation device according to claim 18, wherein said pointer is slidably mounted in a radial housing formed in said casing; said radial housing having a radially inner end open on said abutment seat of the casing.

20. The actuation device according to claim 19, wherein, in said active position, said pointer is at least partially inserted in said abutment seat of the casing and defines a third end stop, for the rotation of the indexing bush with respect to the casing, arranged between said first and second end stop.

* * * * *